US010434710B2

(12) United States Patent
Todorov et al.

(10) Patent No.: US 10,434,710 B2
(45) Date of Patent: Oct. 8, 2019

(54) METHOD AND SYSTEM FOR LAYER-WISE GENERATION OF THREE-DIMENSIONAL MODELS FROM POWDERED MATERIAL

(71) Applicant: "PRINT CAST" LTD, Sofia (BG)

(72) Inventors: Georgi Dimitrov Todorov, Sofia (BG); Tsvetozar Tihomirov Ivanov, Botevgrad (BG)

(73) Assignee: "PRINT CAST" LTD, Sofia (BG)

(*) Notice: Subject to any disclaimer, the term of this patent is extended or adjusted under 35 U.S.C. 154(b) by 178 days.

(21) Appl. No.: 15/562,334

(22) PCT Filed: Apr. 1, 2016

(86) PCT No.: PCT/BG2016/000010
§ 371 (c)(1),
(2) Date: Sep. 27, 2017

(87) PCT Pub. No.: WO2016/161489
PCT Pub. Date: Oct. 13, 2016

(65) Prior Publication Data
US 2018/0354190 A1 Dec. 13, 2018

(30) Foreign Application Priority Data
Apr. 9, 2015 (BG) ........................................ 111977

(51) Int. Cl.
*B29C 64/165* (2017.01)
*B29C 64/218* (2017.01)
(Continued)

(52) U.S. Cl.
CPC ............ *B29C 64/165* (2017.08); *B05C 19/04* (2013.01); *B22C 9/02* (2013.01); *B29C 64/205* (2017.08);
(Continued)

(58) Field of Classification Search
CPC ... B29C 64/205; B29C 64/214; B29C 64/218; B29C 64/307; B29C 64/321; B29C 64/343; B29C 64/329
See application file for complete search history.

(56) References Cited

U.S. PATENT DOCUMENTS 5,354,414 A * 10/1994 Feygin ...................... B22C 9/00
156/245
5,387,380 A * 2/1995 Cima ...................... B05C 19/04
264/109
(Continued)

FOREIGN PATENT DOCUMENTS

CN          104401605 A     3/2015
JP            5024936 A     2/1993
(Continued)

OTHER PUBLICATIONS

International Search Report for Application No. PCT/BG2016/000010, dated Oct. 11, 2016.

*Primary Examiner* — Matthew J Daniels
*Assistant Examiner* — Nicholas J Chidiac
(74) *Attorney, Agent, or Firm* — Marshall, Gerstein & Borun LLP

(57) ABSTRACT

The method and system for layer-wise generation of three-dimensional objects from powdered material includes sequential application of powdered material and suitable binder onto a vertically mobile worktop. Depositing is performed by a powdered material application device and a binder application device. The two application devices work in two mutually perpendicular directions along two horizontal planes parallel to each other and the worktop, performing the application in both directions of movement between their final positions. Application devices move and deposit the respective substance at a different optimal rate depending on the process. The method and the system have a wide range of applications in the casting industry for the layer-wise generation of complete sand molds and/or high precision cores directly from a three-dimensional computer model. They reduce the time required to produce casting shapes and improve the accuracy, and also allow the generation of more complex shapes without the need for a physical model.

9 Claims, 5 Drawing Sheets

(51) Int. Cl.
  *B05C 19/04* (2006.01)
  *B29C 64/205* (2017.01)
  *B33Y 30/00* (2015.01)
  *B22C 9/02* (2006.01)
  *B33Y 10/00* (2015.01)

(52) U.S. Cl.
  CPC ............ *B29C 64/218* (2017.08); *B33Y 10/00* (2014.12); *B33Y 30/00* (2014.12); *Y02P 10/292* (2015.11)

(56) References Cited

U.S. PATENT DOCUMENTS

| | | | |
|---|---|---|---|
| 5,934,343 A * | 8/1999 | Gaylo | B22F 3/004 141/12 |
| 6,054,192 A * | 4/2000 | Otsuka | B29C 41/36 156/272.8 |
| 7,509,240 B2 * | 3/2009 | Das | B33Y 30/00 264/16 |
| 8,021,139 B2 | 9/2011 | Kumagai et al. | |
| 8,567,477 B2 | 10/2013 | Rocco et al. | |
| 2001/0050448 A1 | 12/2001 | Kubo et al. | |
| 2003/0074096 A1 * | 4/2003 | Das | B33Y 30/00 700/119 |
| 2013/0171431 A1 * | 7/2013 | Swartz | B32B 37/1284 428/196 |
| 2013/0220570 A1 | 8/2013 | Sears et al. | |
| 2016/0151973 A1 * | 6/2016 | Juan Jover | B29C 64/35 264/462 |
| 2017/0050270 A1 * | 2/2017 | Miyano | B23K 15/02 |

FOREIGN PATENT DOCUMENTS

| | | |
|---|---|---|
| JP | 10211656 A | 8/1998 |
| JP | 2012-131094 A | 7/2012 |
| JP | 2013-151165 A | 8/2013 |
| KR | 10-2015-0022867 A | 3/2015 |
| WO | WO-0196048 A1 | 12/2001 |
| WO | WO-2015/106832 A1 | 7/2015 |
| WO | WO-2015/127519 A1 | 9/2015 |

* cited by examiner

METHOD AND SYSTEM FOR LAYER-WISE GENERATION OF THREE-DIMENSIONAL MODELS FROM POWDERED MATERIAL

CROSS-REFERENCE TO RELATED APPLICATION

The present application is the US national phase of International Application No. PCT/BG2016/000010, filed Apr. 1, 2016, which claims priority to Bulgarian Application No. 111977, filed Apr. 9, 2015. The priority application, BG 111977, is hereby incorporated by reference.

TECHNICAL FIELD

The invention relates to the development of a method and system for layer-wise generation of three-dimensional models from pure powdered material or premixed with an activator through depositing in layers and binding the particles of each layer by applying a binder added only where the solid body of the model is being generated. This procedure is subsequently repeated until the whole pattern is constructed. The method and the system have a wide range of applications in various fields, especially in casting for the generation of complete high precision sand molds and/or cores directly from a three-dimensional computer model. The method and the system eliminate the need to construct physical molds and allow the generation of very complex casting patterns without the need to use a physical model, which in turn shortens the time frame for the production of casting workpieces enabling the development of new designs, molds, and weight reduction techniques.

BACKGROUND ART

There are known systems for layer-wise generation of three-dimensional models from powdered material (US2013/0220570A1) in which the bulk powdered material is deposited by a device, which following application returns quickly to its initial position. When this device returns to its initial position a second device is actuated, which in turn applies the binder by traversing the entire work area and upon completing its run returns to the initial position. Therefore, actions are sequentialized in non-conflicting cycles resulting in waiting times.

In other known systems, the means for deposition of powdered material and a binder move in one direction (US2013/0220570A1, U.S. Pat. No. 8,567,477 B2) or sit onto a single tray (US2001/0050448 A1, U.S. Pat. No. 8,021,139 B2) with identical speed of travel and one- or two-directional movement.

WO 01/96048 A1 relates to a system with one-directional movement of the powder application device and perpendicularly to movement system for applying a binder application device running over the same plane, both systems operate in one direction and then return idly to the initial position, thus waiting for the other to complete its action. Furthermore, the binder application device does not deposit the binder in a single pass over the entire width of the worktop but rather scans it step by step.

The disadvantage of known solutions is that the operating cycle is long due to the presence of non-overlapping initial position return times of the application device for powdered material resulting in reduced overall productivity. The one-directional movement of the powdered material application device and the idle return run, and the movement in the same direction or perpendicularly of the binder application device means that both devices must have a waiting time for the return to the initial position during each operating cycle.

DISCLOSURE OF THE INVENTION

The task of this patent is to establish a system for layer-wise generation of three-dimensional models, which would replace the classical method of producing sand molds, cutting the time for the production of casting shapes and improving the accuracy, as well as to allow the generation of more complex shapes without the need to process the workpiece (e.g. casting angles, division lines, etc.). Furthermore, it will allow the generation of combined multi-cluster shapes with integrated cores without the technical limitations imposed by the need for the assembly of shapes and cores.

The problem is solved by developing a new method and a new system for organizing operating movements and the dosing of the initial powdered material, as well as its application in the working area of the machine.

A method for layer-wise generation of three-dimensional models from a powdered material is developed, comprising multiple sequential applications of powdered material and a suitable binder onto a vertically mobile worktop, where the powdered material is deposited by a powder material application device, and the binder is selectively applied by a binder application device following a preset pattern on the respective layer of the object being generated, whereby the aforementioned devices apply in sequence respectively the powdered material and the binder moving forward and backward perpendicularly to each other between two different final positions for each device, and the said movement of the above mentioned devices is carried out along two practically horizontal planes parallel to each other over the worktop. As per the invention, the two application devices deposit respectively the powdered material and the binder in both directions during their movement between final positions. The application operating cycle for the method includes:

application stage for the powdered material by the application device in one direction,
subsequent stage of selective application of binder onto the powdered material layer by the binder application device in a perpendicular direction,
stage of lowering the worktop one step equal to the thickness of the powdered material layer to be applied during the next operating cycle,
repetition of the application stages in the same order during the return of the application devices, and
subsequent stage of lowering the worktop one step further.

The aforementioned application cycle is repeated multiple times until the three-dimensional model is generated.

Preferably, during each operating cycle the powdered material application device is loaded by a feeding device located at one of the final positions of the application device. Loading is performed entirely within the return operating stage of the binder application device, and the quantity of the loaded material is sufficient to apply two layers of powdered material.

Preferably, the stages for the application of powdered material include layer leveling and smoothing processes whereby the mutual setup of the powdered material application device and the binder application device with regard to the movement along parallel planes is carried out by reference to the plane resulting from the application, leveling, and smoothing of the powdered material.

In the preferred embodiment of the invention, the binder is applied selectively through micro-injection by a set of nozzles located in the binder application device so that these allow application over the entire working surface of the worktop without gaps in the cover, and the binder is supplied continuously to the binder application device without a loading step.

A device is developed for the application of powdered material as part of a system for layer-wise generation of three-dimensional models from powdered material. This device consists of a housing, container for bulk powdered material, dosing roller located under the container along the device, driving mechanism for the roller, two limiters located on both sides of the dosing roller, support located under the dosing roller, two chutes for the powdered material located under the dosing roller symmetrically on both sides of a centered longitudinal smoothing element. The dosing roller can rotate in both directions depending on the direction of movement of the powdered material application device so that the material can be supplied alternatively on both sides of the smoothing element through the chutes.

Preferably, the container must be capable of holding enough powdered material for two layers.

Preferably, the device for the application of powdered material also has two valves which allow one powdered material chute to be open while the other one is closed depending on the dosing roller's direction of movement, whereby in operating mode, the chute in front of the smoothing element is open in the direction of movement of the device.

A system for layer-wise generation of three-dimensional models from powdered material is developed as per the invention method, consisting of a vertical sliding worktop, powdered material application device, binder application device which follows a preset pattern within a single layer of the object being generated, loading device for feeding powdered material into the application device, control unit providing system actuation and control, and guides for the application devices. The application devices are constructed so as to allow forward and backward movement along said guides in two perpendicular trajectories between the respective final positions for each device, with the two aforementioned application devices capable of moving and respectively applying the powdered material and binder in two horizontal planes parallel to each other and the worktop. According to the invention the above mentioned final positions of the application devices are outside the operating area of the other device. The two application devices are designed so that they can apply respectively the powdered material and the binder in both directions between their final positions.

In the preferred embodiment of the system for layer-wise generation of models from powdered material, the guides of the two application devices are mutually perpendicular and placed at a distance from one another. The higher guide is mounted over the respective application device, and the lower guide is mounted under the respective application device in order to ensure that the two application devices pass each other without colliding during operation.

In the preferred embodiment, the application device for powdered material is the device described above as per the invention.

In the preferred embodiment, the initial position of the application device for powdered material is under the loading device.

In one embodiment, the binder application device is based on the principle of micro-injection and has several staggered application heads with nozzles, where the number of application heads is such that their overall working width is equal to the working surface in the direction of movement of the device in question allowing it to cover the entire working surface.

In another alternative embodiment, the binder application device is based on the principle of micro-injection and has one or several staggered application heads with nozzles whose total working width is smaller than the width of the working surface in the direction of movement of the device in question, and an actuating device for linear movement of the application heads laterally with respect to the trajectory of the binder application device.

The advantage of the proposed method and system for three-dimensional generation is that in addition to retaining all positive characteristics of similar existing and known machines, the process is expedited significantly and therefore the resulting casting models are cheaper.

The process is faster as a result of the system's structure, which does not require the powdered material application device to return to the initial (starting) position after depositing one layer of powdered material bur rather to remain in its second final position during the application of the binding substance. In the same manner, after making an operating pass without returning to its initial position, the binder application device waits for the powdered material application device to deposit a new layer and to return to the initial position, after which the binder application device returns to its starting position applying a new layer of the binding substance.

The two application devices are mutually perpendicular and move along perpendicular trajectories at a system-specific speed optimal for the respective process. It is this that allows the performance of the required cycle without idle movements, which increases the overall productivity of the equipment.

The proposed solution avoids the above mentioned shortcomings of known solutions by proposing a structure, which allows for an operating cycle without a waiting period in the initial position of the powdered material application device as it can operate in two directions. The quantity of material loaded into the powdered substance application device is set so that it can go forwards and backwards (depositing two layers of material) with one load, which can be performed in the initial position following the second cycle. What is more, process times for the loading of powdered material and the application of the binder by the second application device overlap. With the elimination of idle return passes of the powdered material application device and two-way scanning runs of the binder application device, the productivity of the operating cycle is increased and along with the overall productivity of the entire system.

The method and the system according to the invention allow the generation of more complex shapes without the need to process the workpiece (e.g. casting angles, division lines, etc.). This result is achieved by eliminating the requirements for a physical model and its extraction, which determine the technical angles and limitations.

Furthermore, the method and the system allow the generation of combined multi-cluster shapes with integrated cores without technical limitations for the assembly of shapes and cores as these are produced simultaneously. Therefore, it is not necessary to construct separately and in parts the shapes and cores, eliminating the need for further assembly and modeling of mold cavities.

BRIEF DESCRIPTION OF THE DRAWINGS

The method and the system for layer-wise generation of three-dimensional models from powdered material according to the invention, are detailed through the preferred embodiments presented as examples, which do not limit the scope of the invention with reference to the enclosed drawings, where.

EXAMPLE OF CARRYING OUT AND ACTION OF THE INVENTION

The method for layer-wise generation of three-dimensional models from powdered material according to the invention includes multiple sequential applications of powdered material and a suitable binder onto a vertically mobile worktop 2. The powdered material could be, for example, foundry sand (moulfing sand) with a grain size of about 0.2 mm, and the suitable binder could be a furan resin. For the skilled in the art it will be apparent that the powdered material could be any material suitable for this purpose and the binder could be any material suitable for binding of the respective powdered material.

Application is carried out respectively by the powdered material application device 1 and the binder application device 3, which deposits the binding agent following a preset pattern onto one layer of the object being generated. The above mentioned application devices 1 and 3 move forward and backward along two perpendicular trajectories between the respective final positions for each device. The two application devices 1 and 3 apply respectively powdered material and binder in two essentially horizontal planes parallel to each other and to the worktop 2, performing the application in both directions of movement between their final positions. Application devices 1 and 3 move and deposit the respective substance at a different optimal rate depending on the process.

Figure 3:
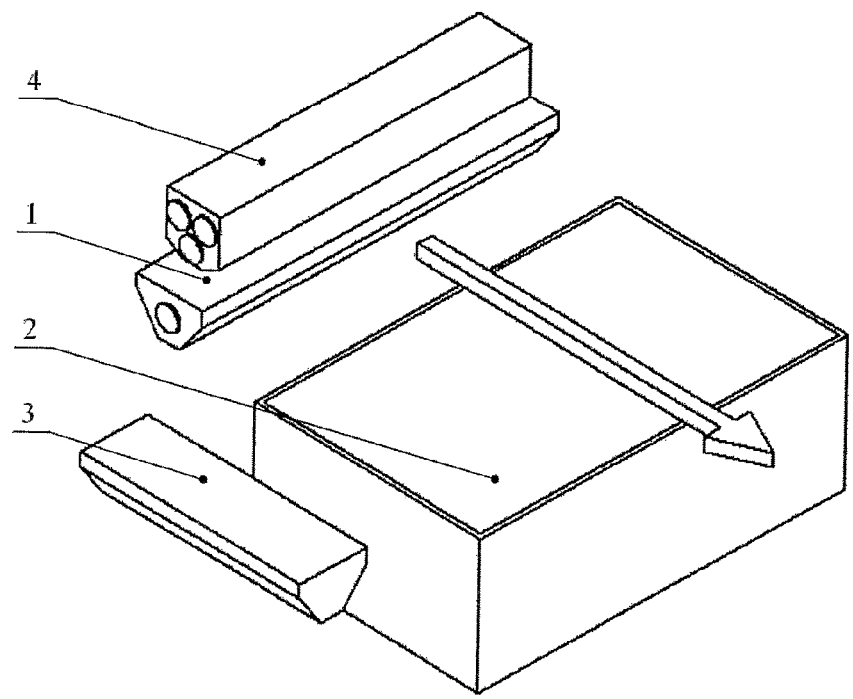
FIG. 3 is a simplified image of the system from FIG. 2 with the application devices 1 and 3 in initial positions at the start of a sequential operating cycle. The arrow indicates the direction of movement of the powdered material application device 1.
Figure 4:
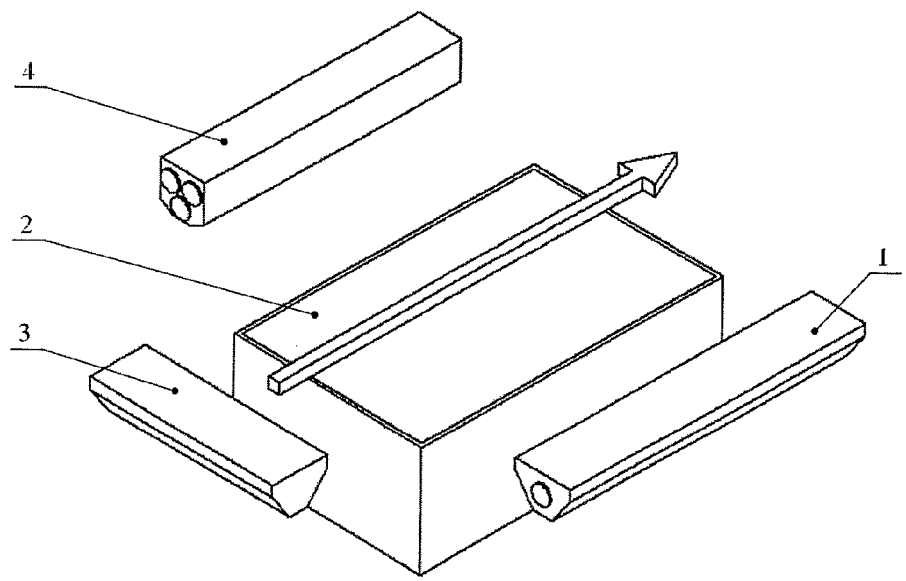
FIG. 4 shows the system at the start of the second stage of the operating cycle when the powdered material application device 1 has made the first depositing pass and is in the second final position opposite its initial position, and the binder application device 3 is on the move, making its first selective application. The arrow indicates the direction of movement of the binder application device 3.
Figure 5:
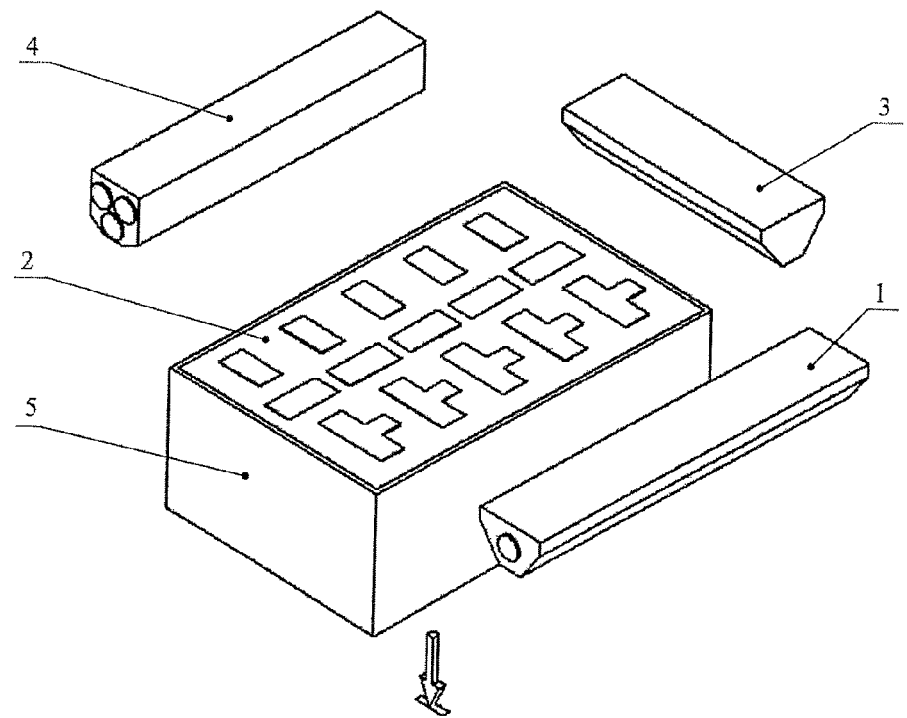
FIG. 5 shows the system in the next stage of the operating cycle when the binder application device 3 has performed the first selective application of the binder and is in the second final position opposite the initial one. The worktop 2 is lowered by one step equal to the thickness of the powdered material layer to be deposited during the next stage of the operating cycle.
Figure 6:
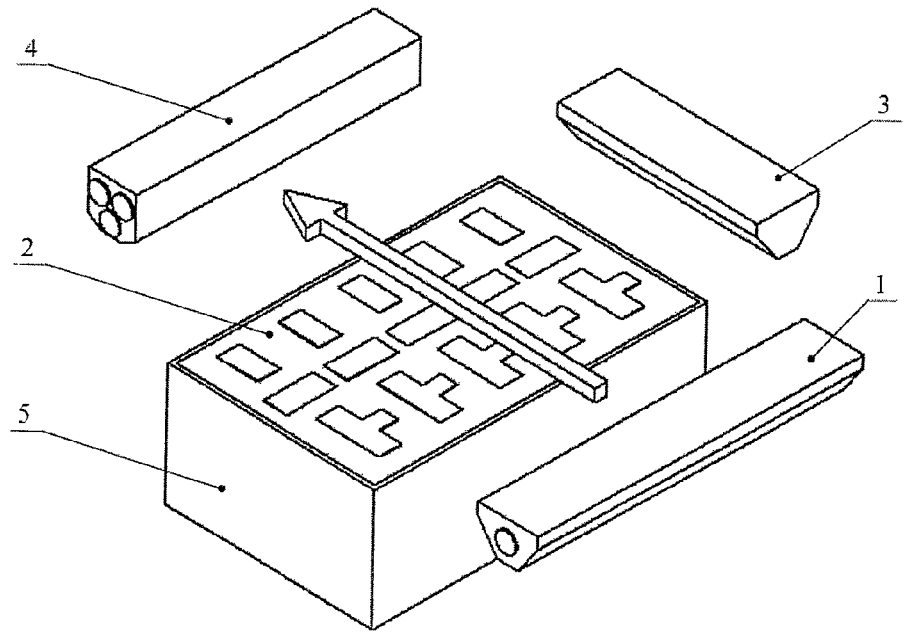
FIG. 6 shows the system at the next stage of the operating cycle when the powdered material application device 1 is moving from its second final position to its initial position during the next depositing, while the binder application device 3 is in its second final position.

The method according to the invention is performed in an application operating cycle which includes:

depositing stage for the powdered material layer by the application device 1 in one direction (FIG. 2b or 3), subsequent stage for selective application of a binder onto the powdered material layer by the binder application device 3 in perpendicular direction (FIG. 4), stage of lowering of the worktop 2 by one step equal to the thickness of the powdered material layer to be deposited during the next operating cycle stage. (FIG. 5), repetition of the application stages in the same sequence in reverse directions of movement of application devices 1 and 3 (FIGS. 6 and 7), and subsequent lowering stage of the worktop 2 (FIG. 8).

In practice, one full operating cycle consists of two such runs of the powdered material and binder application devices.

The above mentioned application operating cycle is repeated multiple times until the three-dimensional object is generated.

The powdered material is deposited all along the working area in one run, which improves greatly the operating speed. The depositing of the material is carried out by coordinating the quantity dosing with the movement speed of the application device.

The zones with selectively applied binder outline the three-dimensional generation of shapes 22 onto the worktop 2 by binding together the powdered material in a solid structure, while the remaining material is left in its powder form.

Figure 7:
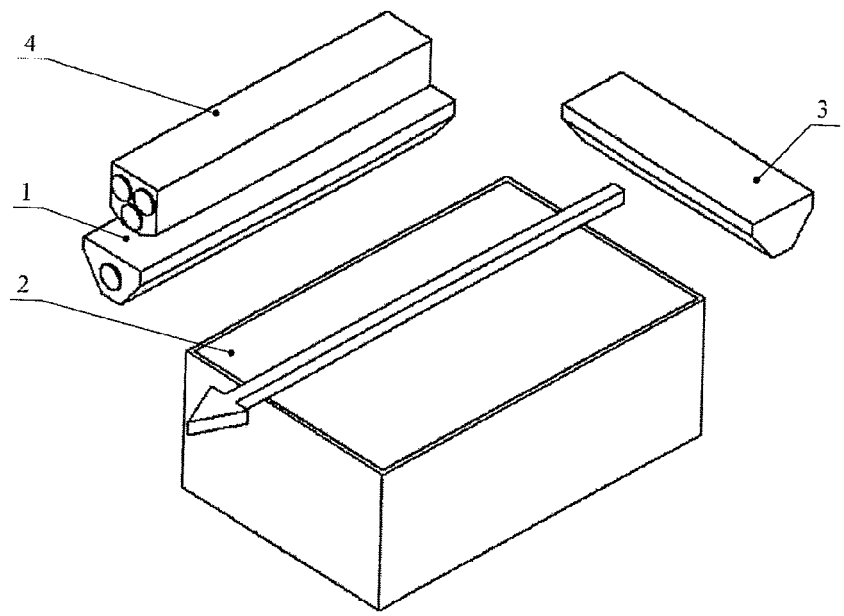
FIG. 7 shows the system at the next stage of the operating cycle when the powdered material application device 1 has deposited the next layer of powdered material and is in its initial position, where it is being loaded with material sufficient for two passes, while the binder application device 3 is moving from its second final position to its initial position and is depositing the binder.
Figure 8:
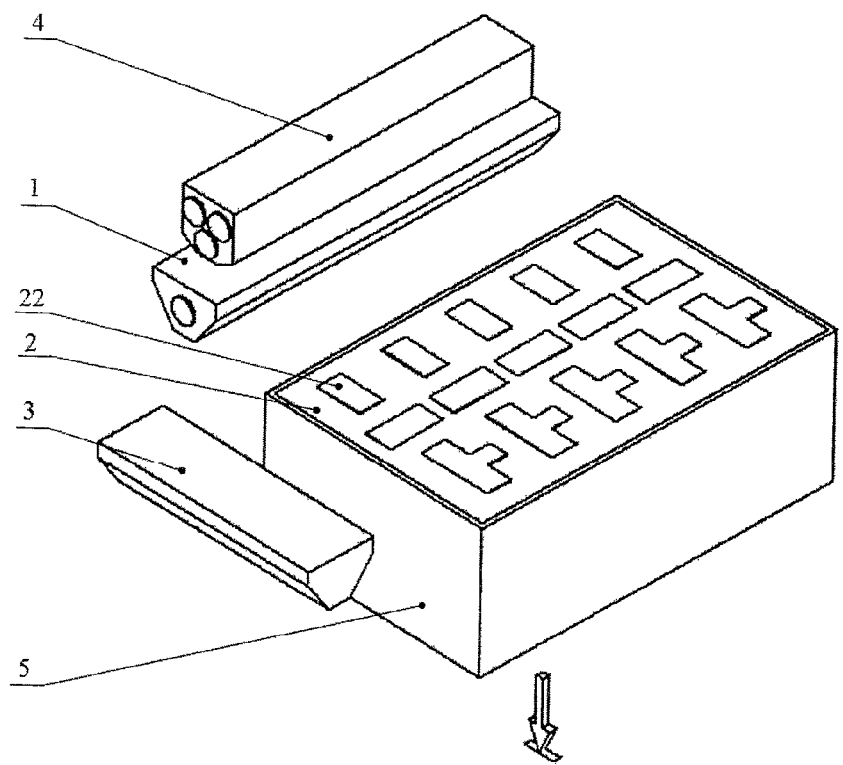
FIG. 8 shows the system at the end stage of the operating cycle when the powdered material application device 1 is in its initial position loaded with new material sufficient for two passes, and the binder application device 3 has finished its second selective application and is also in its initial position, whereby the worktop 2 is lowered by one step equal to the thickness of the powdered material layer to be deposited during the next stage of the operating cycle. Thereby the entire system is in its initial state analogically to FIG. 2 for the starting of a new cycle.

Preferably, with each operating cycle the powdered material application device 1 is to be loaded by a loading device 4, located at the initial position of the powdered application device 1 whereby the loading is completed during the working stage of the binder application device 3 when it is returning (FIG. 7). The quantity of the loaded material must be sufficient to deposit two layers so that the powdered material application system 1 may deposit one layer, wait in the second final position for the binder to be applied, and deposit another layer while returning to the initial position to be reloaded once again. Thus, the reloading time is included in the operating cycle without prolonging it, which results in improved overall productivity of the system.

In the preferred embodiment, powdered material application stages also include layer leveling and smoothing whereby the mutual trajectory setup of the parallel planes for the movement of the powdered material application device 1 and the binder application device 3 is performed based on the plane resulting from the depositing, leveling, and smoothing of the powdered material.

Preferably, the binding substance is applied selectively through micro-injection by a set of nozzles located in the binder application device 3 positioned so as to allow application over the entire working surface of the worktop 2 without any coverage gaps (FIG. 10); the binding substance is supplied continuously to the application device 3 without a loading delay.

Figure 1:
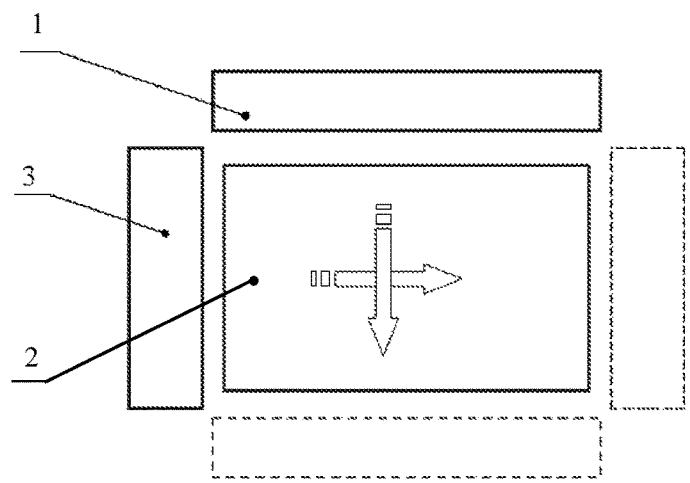
FIG. 1 shows a schematic of the trajectories of the application devices between the two final positions in mutually perpendicular directions as per the invention.

According to the invention, the system for layer-wise generation of three-dimensional models using the method described above and given as a schematic in FIG. 2 consists of a vertically mobile worktop 2, powdered material application device 1, binder application device 3 moving along a preset pattern over a layer of the object being generated, loading device 4 for reloading the powdered material application device 1, control unit (not shown in the drawings) actuating and controlling the guides 11 and 12, respectively for each of the application devices 1 and 3. Application devices 1 and 3 are designed so as to allow backwards and forwards movement along the aforementioned guide 11 and 12 in mutually perpendicular directions between two different final positions for each device located outside the movement range of the other device (FIG. 1). The movement of the said two application devices 1 and 3, and respectively the depositing of the powdered material and the binder are carried out in two planes which are parallel to each other and to the worktop 2. The said two application devices 1 and 3 are constructed so as to allow two-directional operation in order to deposit respectively the powdered material and the binder in both directions of movement between their final positions.

The powdered material may be premixed with an activating agent.

In the preferred embodiment, the vertically mobile worktop 2 is a vertically mobile bottom of a container 5 wherein the three-dimensional object is generated.

The bearing structure of the system may be a metal framework located on a base plate with a lifting system 10 for the worktop 2 along which the container 5 moves.

The overall system structure may be viewed as a multi-level one. The container fixed to the machine frame moves at the first level, which also houses the lifting system for the worktop 2—in this case—the container bottom. The powdered material and the binder are applied at the second level, which also houses the devices necessary to perform these actions along with their actuators. The third level houses the loading devices for the operating process, as well as electrical and control systems.

The operating cycle of the system for layer-wise generation of three-dimensional objects from powdered material is described above in relation to the method. These mutually perpendicular and sequential kinematics allow for an operating cycle to be completed at an optimal rate and within the shortest possible time frame for the respective process.

In the preferred embodiment (FIG. 2) guides 11 and 12, respectively, for the two application devices 1 and 3 are mutually perpendicular and located one above the other. The top guide 11 or 12 is located over the respective application device 1 or 3, while the bottom guide 11 or 12 is situated under the respective application device 1 or 3. In this manner, it is ensured that the two application devices 1 and 3 pass each other without colliding during their operation.

Figure 2:
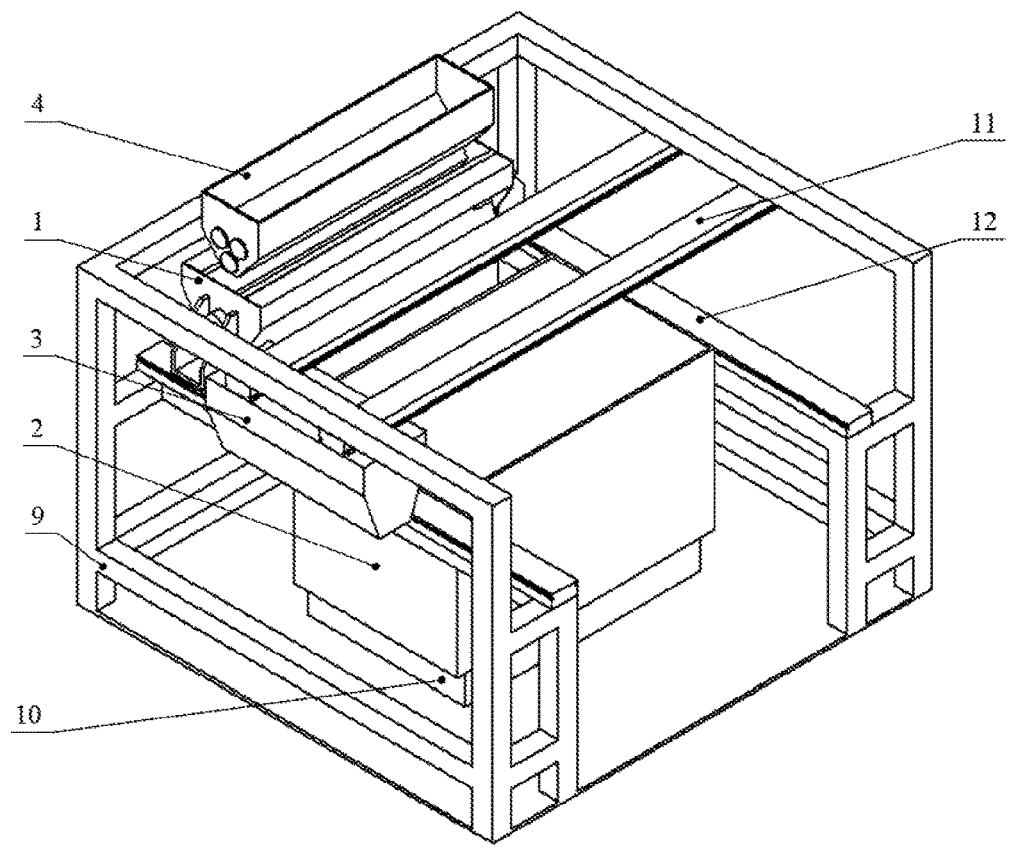
FIG. 2 shows a schematic view of the system for layer-wise generation of three-dimensional models from powdered material according to the invention with the application devices 1 and 3 in initial positions.

In the example shown in FIG. 2 for an embodiment of the invention, the guides are constructed as a pair of parallel rails for each application device. In this case, the top guide 11 is located over the binder application device 3, which is actuated by drive mechanism (not shown in the figure). The bottom guide 12 is located under the powdered material application device 1, which moves along its rails. The two guides must ensure that the movement planes are parallel.

As shown in FIG. 2, in its initial position the powdered material application device 1 is located under the loading device 4.

Figure 10:
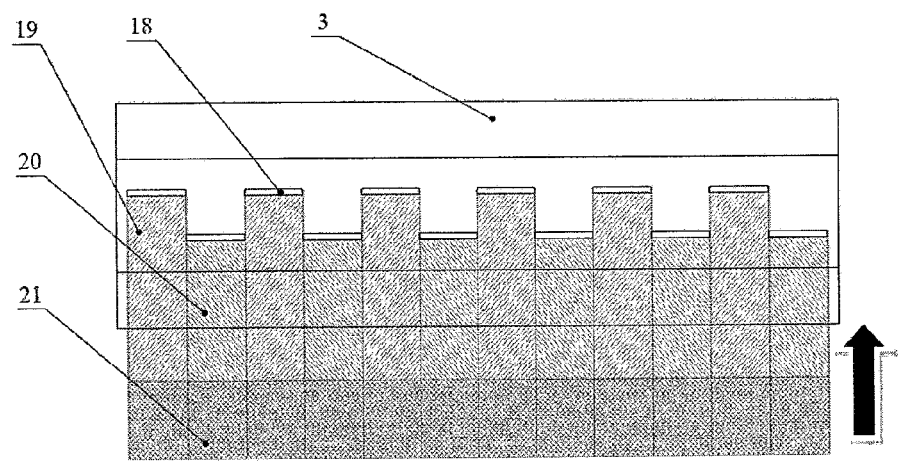
FIG. 10 shows a schematic of the binder application device with staggered application nozzles.

In the preferred embodiment, the binder application device 3 is based on the principle of micro-injection and takes the form of a beam, on both sides of which, there are 18 staggered application heads with binder injection nozzles. The number of the application heads is such that their total working width (represented by their tracks 19 and 20) equals the working surface width 21 along the movement axis of this device (FIG. 10). This allows for the application to be performed in one pass. If the system needs to be constructed at a lower cost, one or fewer application heads may be used and designed so that these would move perpendicularly along the beam in order to cover the entire working surface.

Figure 9:
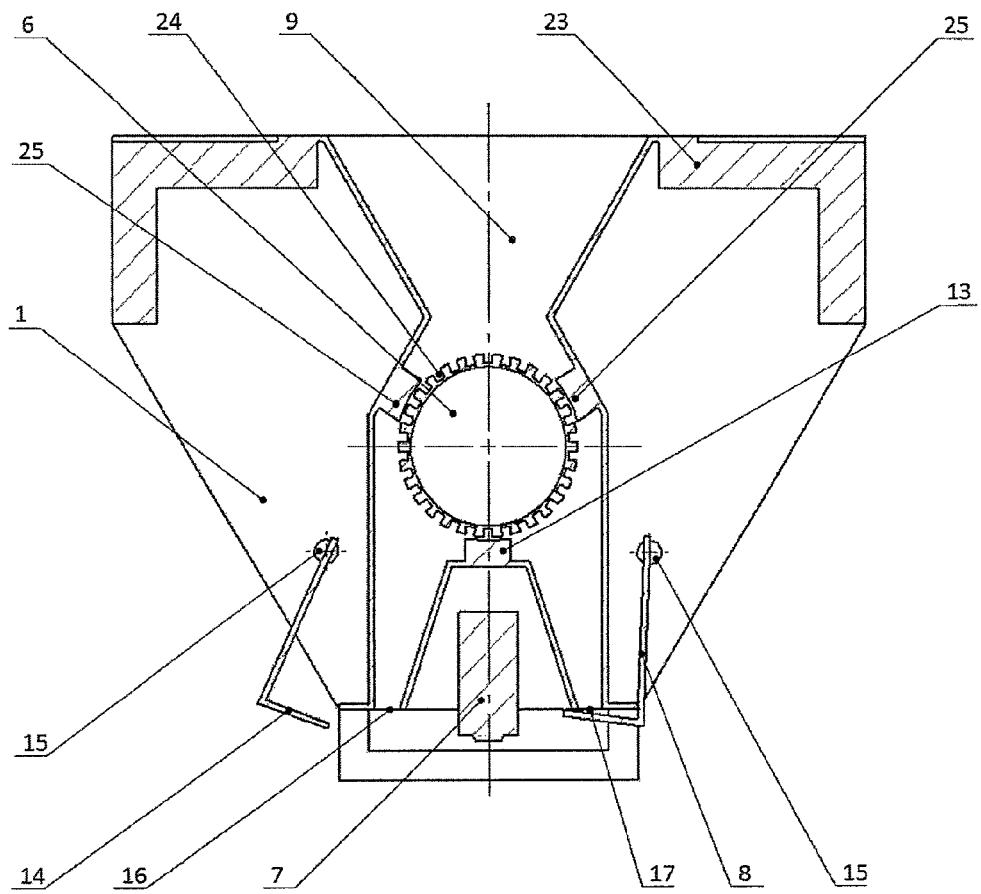
FIG. 9 shows a cross-section of the preferred embodiment of the powdered material application device as per the invention.

In the preferred embodiment shown in FIG. 9, the powdered material application device includes a housing 23, container 9 for bulk powdered material, dosing roller 6 located under container 9 along the length of the device, and an actuator for the roller (not shown in the figure). On both top sides of the dosing roller 6, there are two limiters for the powdered material 25. Under the dosing roller 6, there is a support 13, with the dosing roller 6 mounted onto bearings at the sides of the housing 23 (not shown in the figure). Parallel beneath the dosing roller 6, there are two chutes 16 and 17 for the feeding of the powdered material. Chutes 16 and 17 for the feeding of the powdered material are symmetrically mounted on both sides of the centered longitudinal smoothing element 7. The dosing roller 6 has a special elastic cover with longitudinal grooves 24 for transporting and dosing the powdered material and can rotate in both directions depending on the trajectory of the powdered material application device 1, so that the powdered material may be fed alternatively on both sides via one of the two chutes located in front of the smoothing element 7 along the trajectory of the device. The container 9 for the powdered material is filled so as to accommodate a quantity sufficient for two layers. The application device 1 described above provides two-directional depositing of bulk powdered material as per the method of the present invention.

Preferably, the smoothing element 7 oscillates transversely to the direction of movement and has a special wear-resistant coating.

In order to prevent residual quantities of material being deposited, the design includes two valves 8 and 14 which open chutes 16 and 17. In the embodiment shown in FIG. 9, valves 8 and 14 are L-shaped but another suitable configuration may be used. Preferably, valves 8 and 14 are hinge-mounted onto the housing 23 sidewalls on swivel axes 15 which run parallel to the rotation axis of the dosing roller 6. Valves 8 and 14 open and close depending on the direction of rotation of the dosing roller 6. Valve 8 is designed to close chute 17 and respectively valve 14 to close chute 16 when the corresponding chute is located behind the smoothing element 17 along the direction of movement of the device. For example, if chute 17 is behind the smoothing element 7 with respect to the trajectory of the device, the said chute 17 will be closed in this direction by valve 8 while at the same time chute 16 will be opened.

The powdered material application device may be viewed as a beam, rigidly attached at one end to a drive mechanism which provides actuation at a certain speed and acceleration.

At the other end it is attached flexibly to another driving element. This flexible link allows for any structural or mounting inaccuracies to be compensated, also handling longitudinal deformations which result from temperature strains or use of non-homogeneous materials. This is made possible by flexible elements which allow deformations along the axis of the transporting system. The two linear actuators are synchronized via a rigid connection provided by a shaft ensuring one end does not lag behind the other.

For the specialists in this field, it is clear that many modifications may be made to the method and the system for layer-wise generation of three-dimensional objects from powdered material, which are also covered by the invention defined in the enclosed claims. All system parts may be replaced with technically equivalent components.

Reference numbers of technical features are included in the claims only to clarify the claims further, and, therefore, these reference numbers are not limiting with regard to the interpretation of the components designated thereby.

The invention claimed is:

1. A device for applying powdered material as a part of a system for layer-wise generation of three-dimensional models from powdered material comprises a housing, a container for bulk powdered material, a volumetric dosing roller located under the container along the length of the device, driving mechanism for the roller, two limiters installed on both sides of the volumetric dosing roller, a support mounted under the volumetric dosing roller, and two chutes for supplying powdered material, said chutes being located under the volumetric dosing roller symmetrically on both sides of a centered longitudinal smoothing element, wherein the volumetric dosing roller is shaped so as to allow for rotation in both directions depending on the trajectory of the powdered material application device so that the powdered material can be supplied alternatively on both sides of the smoothing element via the chutes, the two chutes being configured such that rotation of the volumetric dosing roller in a first direction directs powdered material to a first one of the chutes, and that rotation of the volumetric dosing roller in a second direction directs powdered material to a second one of the chutes.

2. The powdered material application device as per claim 1, the container being capable of holding bulk powdered material sufficient for the depositing of two layers.

3. The powdered material application device as per claim 1 further including two valves, designed so as to allow for one valve to open one of the chutes for the depositing of powdered material and simultaneously close the other chute depending on the direction of rotation of the volumetric dosing roller, wherein during operation, the chute, located in front of the smoothing element in the direction of movement of the device, is opened.

4. The powdered material application device as per claim 1, the dose limiters being at distal ends of the respective chutes.

5. A system for layer-wise generation of three-dimensional objects from powdered material comprising a vertically mobile worktop, a powdered material application device, a binder application device moving along a preset pattern over a layer of the object being generated, a loading device for reloading the powdered material application device, a control unit for actuating and controlling of the system, and guides, respectively for each of the application devices, where said application devices allow backwards and forwards movement along the said guides in two mutually perpendicular directions between two end positions for each application device, said end positions of said two application devices being outside the movement range of the other device, wherein said two application devices are capable of moving and respectively applying the powdered material and binder deposition in both directions between their end positions and in two horizontal planes parallel to each other and the worktop, the powdered material application device being a device according to claim 1.

6. A system for layer-wise generation of three-dimensional objects from powdered material according to claim 5, the guides of the two application devices being mutually perpendicular and placed at a distance one above the other, wherein the guide with higher position is mounted over the respective application device, and the guide with lower position is mounted under the respective application device in order to ensure that the two application devices pass each other without colliding during operation.

7. A system for layer-wise generation of three-dimensional objects from powdered material according to claim 5, the end positions of the application device for powdered material being located under the loading device.

8. A system for layer-wise generation of three-dimensional objects from powdered material according to claim 5, the binder application device being based on the principle of micro-injection and has several staggered application heads with nozzles, where the number of deposition heads is such that their overall working width is equal to the total width of the working surface in the direction of movement of said device allowing it to cover the entire working surface.

9. A system for layer-wise generation of three-dimensional objects from powdered material according to claim 5, the binder application device being based on the principle of micro-injection and has one or several staggered application heads with nozzles whose total working width is smaller than the width of the working surface in the direction of movement of said device, also having an actuating device providing linear movement of the application heads laterally to the direction of movement of the binder application device.

* * * * *